United States Patent
Ishigami et al.

(10) Patent No.: US 10,466,453 B2
(45) Date of Patent: Nov. 5, 2019

(54) OPTICAL SYSTEM AND OPTICAL DEVICE PROVIDED THEREWITH

(71) Applicant: NIKON CORPORATION, Chiyoda-ku, Tokyo (JP)

(72) Inventors: Hiroyuki Ishigami, Yokohami (JP); Kunihiko Shimizu, Tokorozawa (JP); Akihiko Obama, Tokyo (JP); Takuji Hamasaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 88 days.

(21) Appl. No.: 14/694,911

(22) Filed: Apr. 23, 2015

(65) Prior Publication Data

US 2015/0226930 A1    Aug. 13, 2015

Related U.S. Application Data

(63) Continuation of application No. PCT/JP2013/078549, filed on Oct. 22, 2013.

(30) Foreign Application Priority Data

Oct. 23, 2012  (JP) ................................ 2012-233971

(51) Int. Cl.
*G02B 15/16* (2006.01)
*G02B 9/10* (2006.01)
(Continued)

(52) U.S. Cl.
CPC ............. *G02B 15/161* (2013.01); *G02B 9/04* (2013.01); *G02B 9/10* (2013.01); *G02B 13/18* (2013.01);
(Continued)

(58) Field of Classification Search
CPC .. G02B 9/04–10; G02B 13/04; G02B 15/161; G02B 15/173; G02B 15/20
(Continued)

(56) References Cited

U.S. PATENT DOCUMENTS 3,868,174 A * 2/1975 Yakota ................... G02B 13/02
                                                         359/746
5,276,552 A * 1/1994 Kohmoto ................. G02B 7/10
                                                         359/601
(Continued)

FOREIGN PATENT DOCUMENTS

JP       2001-108879 A      4/2001
JP       2001-296465 A     10/2001
(Continued)

OTHER PUBLICATIONS

Sadahiko Juji, "All of Lens Designing, . . . Exploring the Essence of Optical Designing . . . " K.K. Denpa Sinbunsha, Sep. 10, 1996 p. 171, p. 173, p. 181, p. 316, $1^{st}$ ed., $1^{st}$ printed.
(Continued)

*Primary Examiner* — Nicholas R. Pasko
(74) *Attorney, Agent, or Firm* — Shapiro, Gabor and Rosenberger, PLLC (57) ABSTRACT

An optical system comprises a first lens group G1 disposed in a most object side and having positive refractive power, a stop member ST disposed at an image side of the first lens group G1, and a second lens group G2 disposed at an image side of the stop member ST. A predetermined conditional expression is satisfied, whereby light beyond the maximum angle of view collected on the focal point position of a most object side lens group having positive refractive power is reduced, so that heat generated by a member in the vicinity of the focal point position is reduced.

10 Claims, 6 Drawing Sheets

(51) Int. Cl.
*G02B 9/04* (2006.01)
*G02B 13/18* (2006.01)
*G02B 15/20* (2006.01)
*G02B 15/173* (2006.01)
*G02B 1/11* (2015.01)
*G02B 27/64* (2006.01)

(52) U.S. Cl.
CPC ........... *G02B 15/173* (2013.01); *G02B 15/20* (2013.01); *G02B 1/11* (2013.01); *G02B 27/646* (2013.01)

(58) Field of Classification Search
USPC ....... 359/682, 691, 692, 748, 753, 793, 794, 359/795
See application file for complete search history.

(56) References Cited

U.S. PATENT DOCUMENTS

| | | | | |
|---|---|---|---|---|
| 5,815,320 | A * | 9/1998 | Hoshi | G02B 15/173 359/683 |
| 5,886,829 | A * | 3/1999 | Goosey, Jr. | G02B 15/163 359/679 |
| 6,078,432 | A * | 6/2000 | Toyama | G02B 15/167 359/689 |
| 6,239,919 | B1 * | 5/2001 | Sato | G02B 7/04 359/684 |
| 6,628,463 | B2 * | 9/2003 | Koike | G02B 9/04 359/717 |
| 7,145,729 | B2 * | 12/2006 | Kreitzer | G02B 9/10 359/649 |
| 7,158,318 | B2 * | 1/2007 | Shine; Nobuyuki | G02B 13/001 359/601 |
| 8,000,026 | B2 * | 8/2011 | Sugita | G02B 27/0025 359/691 |
| 8,284,496 | B2 * | 10/2012 | Imamura | G02B 15/173 359/687 |
| 2007/0188631 | A1 | 8/2007 | Yoshitsugu et al. | |
| 2008/0130133 | A1 | 6/2008 | Yoshitsugu et al. | |
| 2009/0262426 | A1 | 10/2009 | Yoshitsugu et al. | |
| 2011/0002046 | A1 * | 1/2011 | Wada | G02B 13/04 359/683 |
| 2011/0051257 | A1 * | 3/2011 | Wada | G02B 15/177 359/683 |
| 2011/0292253 | A1 | 12/2011 | Nishio | |
| 2012/0242885 | A1 * | 9/2012 | Okubo | G02B 15/173 348/345 |
| 2013/0120640 | A1 * | 5/2013 | Taki | G02B 15/14 348/345 |

FOREIGN PATENT DOCUMENTS

| | | |
|---|---|---|
| JP | 2003-149550 A | 5/2003 |
| JP | 2007-212962 A | 8/2007 |
| JP | 2007-212963 A | 8/2007 |
| JP | 2007-241207 A | 9/2007 |

OTHER PUBLICATIONS

Office Action dated Feb. 2, 2016 in Japanese Patent Application No. 2012-233971.
Extended European Search Report dated Apr. 25, 2016, in European Patent Application No. EP13849089.1.
English Translation of International Preliminary Report on Patentability from International Patent Application No. PCT/JP2013/078549, dated May 7, 2015.
International Search Report from International Patent Application No. PCT/JP2013/078549, dated Feb. 4, 2014.

* cited by examiner

OPTICAL SYSTEM AND OPTICAL DEVICE PROVIDED THEREWITH

TECHNICAL FIELD

The present invention relates to an optical system and an optical apparatus equipped therewith.

BACKGROUND ART

Recently, in an optical system used in a camera and the like, there is a tendency that a most object side lens group is large-sized in accordance with angle of view being enlarged and an aperture being enlarged. Because of this tendency, light outside of an effective flux of a lens is made incident on the most object side lens and deteriorates optical performance, and therefore an optical system taking any measures for avoiding this has been proposed. For example, Japanese Patent Application Laid-open No. 2001-296465 should be referred.

PRIOR ART DOCUMENT

Patent Document

Patent Document 1: Japanese Patent Application Laid-open No. 2001-296465

SUMMARY OF THE INVENTION

Problem to be Solved by the Invention

In a case where the most object side lens group in said optical system has positive refractive power, light outside of an effective light flux of the optical system (beyond the maximum angle of view) is made incident on said lens group having positive refractive power and is collected on the position of focal point (field curvature surface) of such positive lens group, so that any member located at this position is heated to be deformed and deteriorated, thereby causing deterioration of optical performance.

The present invention is made in view of the above-described problem, and has an object to provide an optical system and an optical apparatus equipped therewith, the optical system being capable of reducing light outside of an effective light flux (beyond the maximum angle of view) of the optical system that light is collected on the position of the focal point of the most object side lens group having positive refractive power, thereby reducing generation of heat by a member in the vicinity of the focal point of the lens group having positive refractive power so that it is possible to prevent the member from being deformed and deteriorated, thus reducing the influence on the imaging performance.

Means for Solving the Problem

In order to solve the problem, the present invention provides an optical system which comprises a first lens group disposed at a most object side and having positive refractive power; a stop member disposed at an image side of the first lens group; and a second lens group disposed at an image side of the stop member; and the following conditional expressions being satisfied:

$0.20 < ds/f1 < 0.60$ $1.00 \times \varphi 2 < \varphi s < 0.8 \times \varphi 1$ (unit: mm)

where ds denotes a distance in telephoto end state along the optical axis between a lens surface of a most image side lens in the first lens group and the aperture stop, f1 denotes a focal length of the first lens group, $\varphi 1$ denotes an outer diameter of the most image side lens in the first lens group, $\varphi 2$ denotes an outer diameter of a most object side lens in the second lens group, and $\varphi s$ denotes a diameter of an aperture of the stop member.

Further, the present invention provides an optical apparatus equipped with the optical system.

Effect of the Invention

According to the present invention, it is possible to provide an optical system and an optical apparatus equipped therewith, the optical system being capable of reducing light outside of an effective light flux of the optical system (beyond the maximum angle of view), that light being collected on the position of the focal point of the most object side lens group having positive refractive power, thereby capable of reducing heat from being generated by a member in the vicinity of the focal point, so that it is possible to prevent the member from being deformed and deteriorated, thus reducing affecting on imaging performance.

EMBODIMENTS FOR CARRYING OUT THE INVENTION

An embodiment described hereinafter is for easily understanding the present invention but is not intended to avoid or exclude any addition or replacement that can be made into practice within a scope from which the technical idea of the invention of the present application is not deviated.

The optical system of the present application is characterized in comprising a first lens group disposed in a most object side and having positive refractive power, a stop member disposed at an image side of the first lens group and a second lens group disposed at an image side of the stop member. Owing to this configuration, light that is collected on the position of the focal point along field curvature surface of the first lens group having positive refractive power and that is outside of an effective light flux (beyond the maximum angle of view) is reduced by the stop member, so that heat generation by any member in the vicinity of the focal point position being reduced, thereby deformation or deterioration of the member being prevented. Thus, the influence on the imaging performance can be reduced.

An optical system according to the present application is characterized in having a state where the following conditional expressions (1) and (2) are satisfied:

$$0.20 < ds/f1 < 0.60 \quad (1)$$

$$1.00 \times \varphi 2 < \varphi s < 0.8 \times \varphi 1 \quad (2) \text{ (unit: mm)}$$

where ds denotes a distance in a telephoto end state along the optical axis between a lens surface of a most image side lens in the first lens group and the aperture stop, f1 denotes a focal length of the first lens group, φ1 denotes an outer diameter of the most image side lens in the first lens group, φ2 denotes an outer diameter of a most object side lens in the second lens group, and φs denotes a diameter of an aperture of the stop member.

The conditional expression (1) defines a relation of an optimum position of the stop member on the optical axis to the focal length of the first lens group. With satisfying the conditional expression (1), the optical system of the present application can reduce light outside of the effective light flux (beyond the maximum angle of view) that is collected on the focal point position of the first lens group having positive refractive power, so that heat generation of a member in the vicinity of the focusing position is reduced, thereby deformation as well as deterioration of the member being reduced and thus the influence on the image performance is able to be reduced.

When the value ds/f1 of conditional expression (1) is equal to or falls below the lower limit, it becomes not possible to reduce superbly light out of an effective light flux (beyond the maximum angle of view) that is collected on the focal point position of the first lens group having positive refractive power and it becomes difficult to reduce the influence on the imaging performance. This is not preferable.

On the other hand, when the value ds/f1 of conditional expression (1) is equal to or exceeds the upper limit, an end of the stop member is located in the effective light flux and blocks the effective light flux from passing, and thereby the imaging performance being influenced, so it is not preferable. Further, light rays are collected on the end of the stop member, so that the stop member generates heat, thereby the imaging performance being influenced. This is not preferable.

The conditional expression (2) defines a proper aperture diameter of the stop member with a relation of outer diameters of the first lens group and the second lens group. With satisfying the conditional expression (2), light outside of an effective light flux (beyond the maximum angle of view) that is collected on the focal point position of the lens group having positive refractive power, is reduced, thereby heat generation of a member in the vicinity of the focal point position being reduced, so that deformation as well as deterioration of the member is reduced and thus the influence on the image performance being reduced.

When the value φs of the conditional expression (2) is equal to or falls below the lower limit, an end of the stop member is located in the effective light flux of the optical system to shield light rays, thus the imaging performance being influenced. It is not desirable. Moreover, light rays are collected to the end of the stop member, and the stop member is heated, thereby the optical performance being influenced. It is not desirable.

On the other hand, when the value φs of the conditional expression (2) is equal to or exceeds the upper limit, it becomes not possible to reduce superbly light outside of the effective light flux (beyond the maximum angle of view) that is collected on the focal point position of the first lens group having positive refractive power, thereby it becoming difficult to reduce the influence on the imaging performance. It is not desirable.

Further, in the optical system of the present application it is desirable that the aperture diameter of the stop member is larger than the effective diameter of the optical system in the position of the stop member along the optical axis.

In the optical system of the present application an aperture diameter of the stop member is larger than an effective diameter of the optical system in a position of the stop member along the optical axis. Thus, light outside of the effective light flux (beyond the maximum angle of view) that is collected on the focal point position of the first lens group having positive refractive power is reduced without the effective light flux being influenced, so that heat generation of a member in the vicinity of the focal point position is reduced, thereby deformation as well as deterioration of the member being reduced and thus the influence on the imaging performance being reduced. In a case where the aperture diameter of the stop member is not larger than the effective diameter, light rays are apt to impinge on the stop member, be reflected thereby and reach an imaging area as flare, so the imaging performance is deteriorated. It is not preferable.

In the optical system of the present application it is desirable that the optical system is able to vary magnification and upon varying magnification from a wide angle end state to a telephoto end state, a distance between the first lens group and the second lens group varies. With this configuration, the optical system of the present application can realize a variable magnification optical system having a superb imaging performance.

In the optical system of the present application it is desirable that the optical system is able to vary magnification and upon varying magnification from a wide angle end state to a telephoto end state, a distance between the first lens group and the stop member varies. With this configuration, the optical system of the present application can reduce light outside of the effective light flux (beyond the maximum angle of view) that is collected on the focal point position of a lens group having positive refractive power, without influencing on the effective light flux, so that in a state where a member in the vicinity of the focal point position generates easily heat, that is in a state where the first lens group and the second lens group are apart from each other, it becomes possible to make a state where heat generation is least, thereby deformation as well as deterioration of the member being reduced and thus it is possible to reduce the influence on the image performance.

In the optical system of the present application it is desirable that the optical system is able to vary magnification, and upon varying magnification from a wide angle end state to a telephoto end state, a distance between the second lens group and the stop member varies. With this configuration, the optical system of the present application can reduce light outside of the effective light flux (beyond the maximum angle of view) that is collected on the focal point position of a lens group having positive refractive power, without influencing on the effective light flux, so that in a state where a member in the vicinity of the focal point position generates easily heat, that is in a state where the first lens group and the second lens group are apart from each other, it becomes possible to make a state where heat generation is least, thereby deformation as well as deterioration of the member being reduced and thus it is possible to reduce the influence on the image performance.

In the optical system of the present application it is desirable that the optical system is able to vary magnification, and the optical system comprises a moving mechanism for moving the stop member along the optical axis upon varying magnification from a wide angle end state to a telephoto end state. With this configuration, the optical system of the present application allows the stop member to be disposed at an optimum position in the variable magnification optical system, so that the optical system can reduce light outside of the effective light flux (beyond the maximum angle of view) that is collected on the focal point position of a lens group having positive refractive power, and heat generation of a member in the vicinity of the focal point position is reduced, thereby deformation as well as deterioration of the member being reduced and thus it being possible to realize a variable magnification optical system in which the influence on the image performance is reduced.

In the optical system of the present application it is preferable that the stop member has an anti-reflection member on a surface thereof. With this configuration, the optical system of the present application can reduce flare light that is generated by light rays which are outside of the effective light flux (beyond the maximum field of view), impinge on the surface of the stop member and reflected thereby and repeatedly reflected by an internal surface of a lens barrel and reach the imaging plane, so that influence on the imaging performance is reduced.

In the optical system of the present application it is desirable that a position of an optical axis side end of the stop member in the direction of the optical axis is at a more image side than a position of a barrel side end of the stop member in the direction of the optical axis. With this configuration, the optical system of the present application can prevent various members disposed in the lens barrel and the ends of the stop member from interfering with each other, so that the stop member is disposed at a optimum position. Thus, the optical system of the present application can reduce light outside of the effective light flux (beyond the maximum angle of view) that is collected on the focal point position of the lens group having positive refractive power, without influencing on the effective light flux, so that heat generation of a member in the vicinity of the focal point position is reduced, thereby deformation as well as deterioration of the member being reduced and thus the influence on the image performance is reduced.

The optical apparatus of the present application is characterized in comprising the optical system having the configuration as described above. With such a configuration, light outside of the effective light flux (beyond the maximum field of view) collecting on the focusing position of the lens having positive refractive power can be reduced, thereby heat generation of the member in the vicinity of the focal point position being reduced so that deformation as well as deterioration of the member is prevented and the influence on the imaging performance is reduced. Thus, it is possible to realize an optical apparatus having high imaging performance.

Hereinafter, a variable magnification optical system that is an optical system according to each numerical Example of the present application is explained with reference to the accompanying drawings.

FIRST EXAMPLE

Figure 1A:
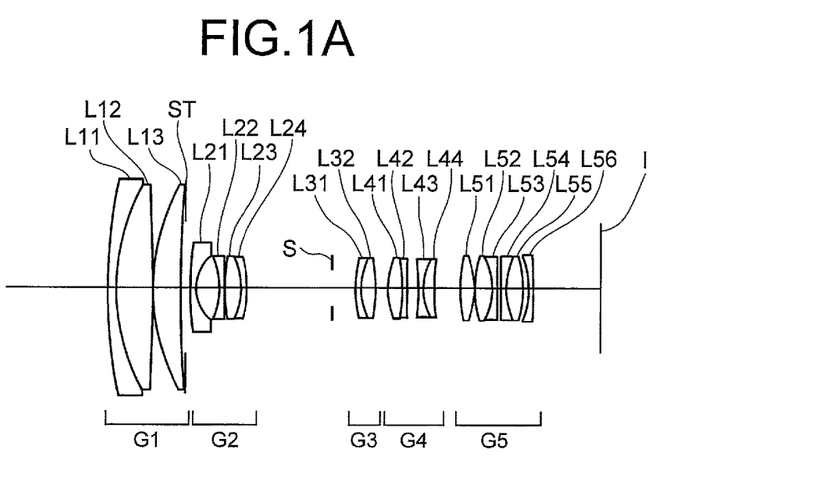
FIGS. 1A, 1B and 1C are sectional views showing an optical system according to a First Example of the present application, in a wide angle end state, in an intermediate focal length state and in a telephoto end state, respectively.
Figure 1B:
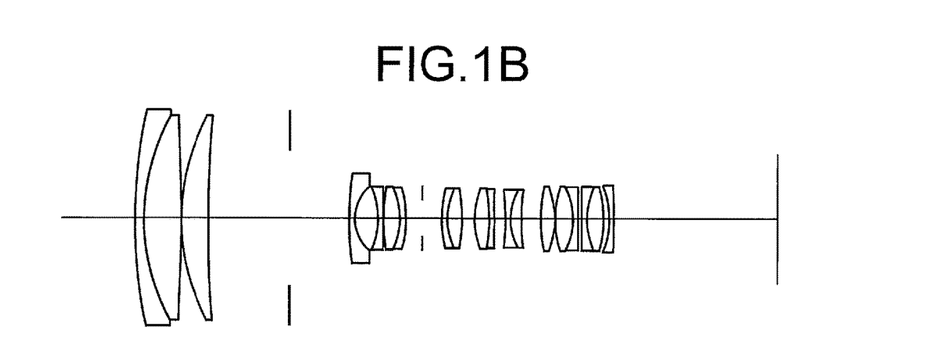
Figure 1C:
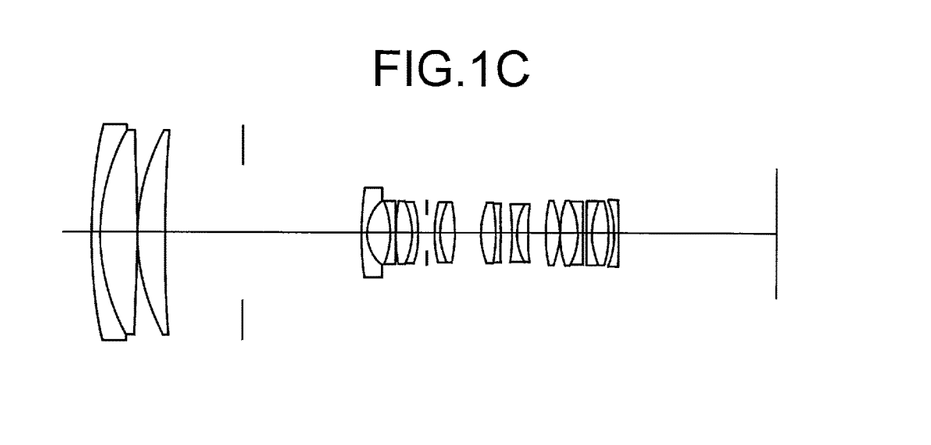

FIGS. 1A, 1B and 1C are sectional views showing an optical system according to a First Example of the present application, in a wide angle end state W, in an intermediate focal length state M and in a telephoto end state T, respectively.

The optical system according to the First Example of the present application, is composed of a first lens group G1 disposed at a most object side and having positive refractive power, a second lens group G2 disposed at an image side of the first lens group G1 and having negative refractive power, a third lens group G3 disposed at an image side of the second lens group G2 and having positive refractive power, a fourth lens group G4 disposed at an image side of the third lens group G3 and having negative refractive power and a fifth lens group G5 disposed at an image side of the fourth lens group G4 and having positive refractive power. An aperture stop S is disposed at the image side of the third lens group G3.

The first lens group G1 is composed of, in order from the object, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, a double convex positive lens L23, and a negative meniscus lens L24 having a concave surface facing the object side. The negative meniscus lens L24 is a glass mold type aspherical lens whose object side lens surface is aspherically shaped.

A stop member ST is disposed between the first lens group G1 and the second lens group G2.

The third lens group G3 is composed of, in order from the object, a cemented lens constructed by a negative meniscus lens L31 having a convex surface facing the object side cemented with a double convex positive lens L32.

The fourth lens group G4 is composed of, in order from the object, a cemented lens constructed by a double convex positive lens L41 cemented with a double concave negative lens L42 and a cemented lens constructed by a double concave negative lens L43 cemented with a positive meniscus lens L44 having a convex surface facing the object side. The double concave negative lens L42 is a glass mold type aspherical lens whose object side surface is aspherically shaped.

The fifth lens group G5 is composed of, in order from the object side, a double convex positive lens L51, a cemented lens constructed by a double convex positive lens L52 cemented with a negative meniscus lens L53 having a concave surface facing the object side, a cemented lens constructed by a negative meniscus lens L54 having a convex surface facing the object side cemented with a double convex positive lens L55, and a negative meniscus lens L56 having a convex surface facing the object side. The negative meniscus lens L56 is a glass mold type aspherical lens whose image side lens surface is aspherically shaped, and light rays exited from the negative meniscus lens L56 forms an image on an imaging plane I.

By the above described configuration, in the variable magnification optical system according to the present First Example, upon zooming from the wide angle end state W to the telephoto end state T, the first lens group G1 is moved toward the object side monotonously, the second lens group G2 is moved toward the object side from the wide angle end state W to the intermediate focal length state M and toward the image side from the intermediate focal length state M to the telephoto end state T, the third lens group G3 is moved toward the object side monotonously, the aperture stop S, the fourth lens group G4 and the fifth lens group G5 are moved toward the object side from the wide angle end state W to the intermediate focal length state M and toward the image side from the intermediate focal length state M to the telephoto end state T, such that a distance between the first lens group G1 and the second lens group G2 is increased, a distance between the second lens group G2 and the third lens group G3 is decreased, a distance between the third lens group G3 and the fourth lens group G4 is increased, a distance between the fourth lens group G4 and the fifth lens group G5 is decreased, a distance between the aperture stop S and the third lens group G3 is decreased, and the aperture stop S and the fourth lens group G4 are moved in a body.

With respect to the stop member ST, upon zooming from the wide angle end state W to the telephoto end state T, a distance between the first lens group G1 and the stop member ST is increased, and a distance between the stop member ST and the second lens group G2 is increased, Incidentally, in the present First Example a low pass filter, a glass for covering a sensor and the like which are not illustrated may be disposed between the negative meniscus lens L56 and the image plane I.

Table 1 below shows various values of the variable magnification optical system according to the present Example.

In table 1, f denotes a focal length, and BF denotes a back focal length (a distance on the optical axis between the most image side lens surface and the image plane I).

In [Surface Data], a surface number denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 mm) and vd denotes an Abbe number for d-line (wavelength λ=587.6 mm). Further, OP denotes an object surface, "variable" denotes a variable surface-to-surface distance and "STOP" denotes an aperture stop S. Meanwhile, radius of curvature r=∞ denotes a plane surface. The position of an aspherical surface is expressed by attaching "*" to the surface number, and in the column of the radius of curvature, a paraxial radius of curvature is shown. Refractive index of air nd=1.000000 is omitted in the description.

In [Aspherical Data], with respect to an aspherical surface shown in [Surface Data], an aspherical surface coefficient and a conical coefficient are shown in the case where the aspherical surface is exhibited by the following expression:

$$X=(h^2/r)/[1+[1-\kappa(h^2/r^2)]^{1/2}]+A4h^4+A6h^6+A8h^8+A10h^{10}$$

where h denotes a vertical height from the optical axis, X denotes a sag amount which is a distance along the optical axis from the tangent surface at the vertex of the aspherical surface to the aspherical surface at the vertical height from the optical axis, κ denotes a conical coefficient, A4, A6, A8 and A10 denote respective aspherical coefficients, and r denotes a paraxial radius of curvature that is a radius of curvature of a reference sphere. "E-n", where n is an integer, denotes "×10$^{-n}$", for example, "1.234E-05" denotes "1.234× 10$^{-5}$". The 2nd order aspherical surface coefficient A2 is 0, and omitted in the description.

In [Various Data], FNO denotes an f-number, ω denotes a half angle of view (unit "°"), Y denotes an image height, TL denotes a total length of the variable magnification optical system, that is, a distance along the optical axis from the first surface to the image plane I upon focusing on an infinitely distant object, do denotes a variable interval between an n-th surface and an (n+1)-th surface, and φ denotes an aperture diameter of the aperture stop S. Meanwhile, W denotes a wide-angle end state, M denotes an intermediate focal length state, and T denotes a telephoto end state.

In [Lens Group Data], ST denotes a starting surface number and a focal length of each lens group.

In [Stop Member Disposition], d1 denotes a distance measured along the optical axis from the most image side lens surface of the first lens group G1 to the most object side lens surface of the second lens group G2, ds denotes a distance measured along the optical axis between the most image side lens surface of the first lens group G1 and the aperture portion of the stop member ST, ds2 denotes a distance measured along the optical axis between the aperture portion of the stop member ST and the most object side lens surface of the second lens group G2, φe denotes an effective diameter of light rays at the position of the stop member ST, φs denotes an aperture diameter of the stop member ST, φ1 denotes an outer diameter of the lens L13 disposed at the most image side of the first lens group G1, φ2 denotes an outer diameter of the lens L12 disposed at the most object side of the second lens group G2.

In [Values for Conditional Expressions], values corresponding to respective conditional expressions are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced its dimension, the unit is not necessarily to be limited to "mm".

Meanwhile, the explanation of reference symbols in Table 1 described above, is the same in Tables for the other Examples.

TABLE 1

First Example

[Surface Data]

| Surface number | r | d | nd | vd |
|---|---|---|---|---|
| OP | ∞ | | | |
| 1 | 104.5118 | 1.6000 | 2.003300 | 28.27 |
| 2 | 39.3751 | 7.4000 | 1.497820 | 82.57 |
| 3 | −463.5701 | 0.1000 | | |
| 4 | 40.3116 | 5.4000 | 1.834810 | 42.73 |
| 5 | 241.9089 | variable | | |
| *6 | 79.9711 | 1.0000 | 1.851350 | 40.10 |
| 7 | 8.1252 | 4.8500 | | |
| 8 | −14.2116 | 1.0000 | 1.883000 | 40.66 |
| 9 | 124.9279 | 0.1000 | | |
| 10 | 30.8124 | 3.3500 | 1.808090 | 22.74 |
| 11 | −15.1873 | 0.3000 | | |
| 12 | −13.2222 | 1.0000 | 1.883000 | 40.66 |
| 13 | −23.0302 | variable | | |
| 14 (STOP) | ∞ | variable | | |
| 15 | 26.1923 | 1.0000 | 1.954000 | 33.46 |
| 16 | 12.2483 | 2.8500 | 1.719990 | 50.27 |
| 17 | −43.5073 | variable | | |
| 18 | 14.5527 | 2.8500 | 1.497820 | 82.57 |
| 19 | −40.3302 | 1.0000 | 1.950000 | 29.37 |
| 20 | 173.4596 | 2.1500 | | |
| *21 | −105.0156 | 1.0000 | 1.806100 | 40.71 |
| 22 | 10.9037 | 2.2000 | 1.808090 | 22.74 |
| 23 | 28.6084 | variable | | |
| 24 | 30.6882 | 2.8500 | 1.579570 | 53.74 |

TABLE 1-continued

First Example

| | | | | |
|---|---|---|---|---|
| 25 | −18.3905 | 0.1000 | | |
| 26 | 18.8919 | 3.6000 | 1.518230 | 58.82 |
| 27 | −13.1344 | 1.0000 | 2.000690 | 25.46 |
| 28 | −2198.5412 | 0.7500 | | |
| 29 | 412.2295 | 1.0000 | 1.954000 | 33.46 |
| 30 | 12.8823 | 3.5000 | 1.755200 | 27.57 |
| 31 | −23.7185 | 1.1500 | | |
| 32 | −16.1296 | 1.0000 | 1.806100 | 40.71 |
| *33 | −97.3104 | BF | | |
| Image plane | ∞ | | | |

[Aspherical Surface Data]

Surface number: 6

| | |
|---|---|
| κ | −8.7294 |
| A4 | 4.64796E−05 |
| A6 | −4.09659E−07 |
| A8 | 2.44519E−09 |
| A10 | −9.90503E−12 |

Surface number: 21

| | |
|---|---|
| κ | −1.5760 |
| A4 | 1.72590E−05 |
| A6 | 9.45415E−08 |
| A8 | −1.00397E−09 |
| A10 | 0.00000E+00 |

Surface number: 33

| | |
|---|---|
| κ | −19.8082 |
| A4 | −1.67719E−05 |
| A6 | −2.11776E−07 |
| A8 | −4.15932E−10 |
| A10 | −1.15008E−11 |

[Various Data]

| | | |
|---|---|---|
| Variable magnification ratio | | 9.42 |
| | W | T |
| f | 10.30 ~ | 97.00 |
| FNO | 4.09 ~ | 5.81 |
| ω | 40.21 ~ | 4.76° |
| Y | 8.19 ~ | 8.19 |

| | W | M | T |
|---|---|---|---|
| f | 10.30000 | 50.00013 | 97.00039 |
| ω | 40.21337 | 9.15519 | 4.75685 |
| FNO | 4.09 | 5.78 | 5.81 |
| φ | 7.68 | 8.50 | 9.20 |
| TL | 100.29944 | 130.25093 | 139.59967 |
| d5 | 2.10000 | 28.50000 | 39.66696 |
| d13 | 17.38897 | 3.31447 | 2.00000 |
| d14 | 4.87082 | 3.98262 | 1.60000 |
| d17 | 2.59389 | 3.48209 | 5.86471 |
| d23 | 5.29632 | 3.42829 | 3.30000 |
| BF | 13.94944 | 33.44346 | 33.06800 |

[Lens Group Data]

| Group | Starting surface | f |
|---|---|---|
| 1(f1) | 1 | 64.38705 |
| 2 | 6 | −9.57903 |
| 3 | 15 | 29.91408 |
| 4 | 18 | −81.48313 |
| 5 | 24 | 28.77173 |

[Stop Member Disposition]

| | W | M | T |
|---|---|---|---|
| f | 10.30000 | 50.00013 | 97.00039 |
| d5 | 2.10000 | 28.50000 | 39.66696 |
| ds | 1.80000 | 16.20000 | 16.20000 |
| ds2 | 0.30000 | 12.30000 | 23.46696 |
| φe | 19.6 | 20.7 | 24.4 |

TABLE 1-continued

First Example

φs = 26.5
φ1 = 40.0
φ2 = 17.5

[Values for Conditional Expressions]

(1) ds/f1 = 0.25 (in the telephoto end state)
(2) φs = 26.5 (unit: mm)
1.00 × φ2 = 17.5
0.80 × φ1 = 32.0

In the optical system according to the First Example of the present application, the aperture diameter φs of the stop member ST is larger than the effective diameter φe of the light rays at the position of the stop member ST. A light reduction ratio by the stop member ST in the telephoto end state T is about 25% in the imaging point position of the first lens group G1 at the height 22 mm from the optical axis, thus attaining sufficient light reduction effect.

SECOND EXAMPLE

Figure 2A:
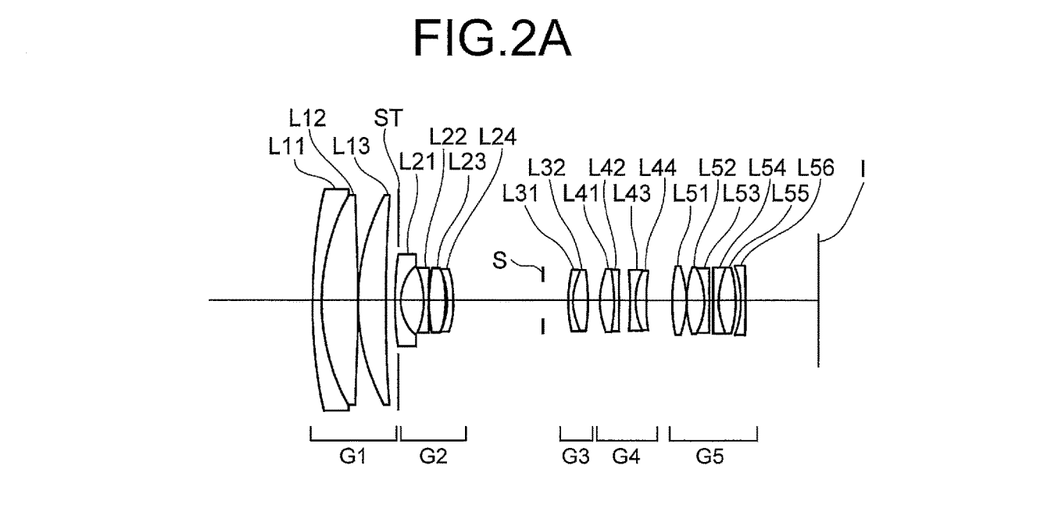
FIGS. 2A, 2B and 2C are sectional views showing an optical system according to a Second Example of the present application, in a wide angle end state, in an intermediate focal length state and in a telephoto end state, respectively.
Figure 2B:
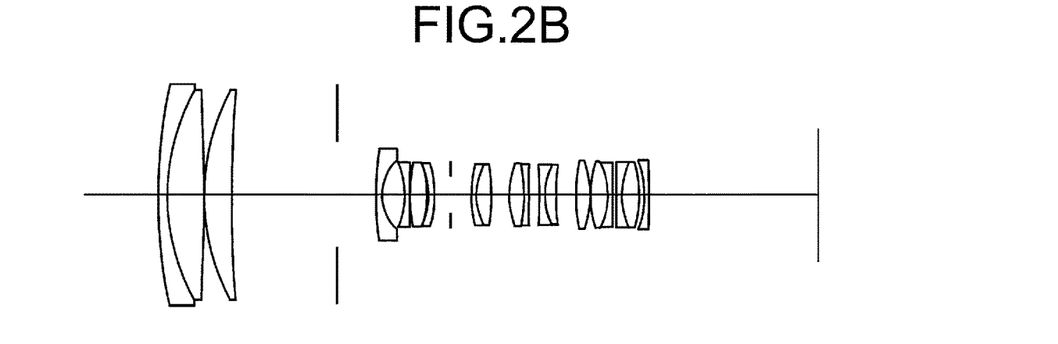
Figure 2C:
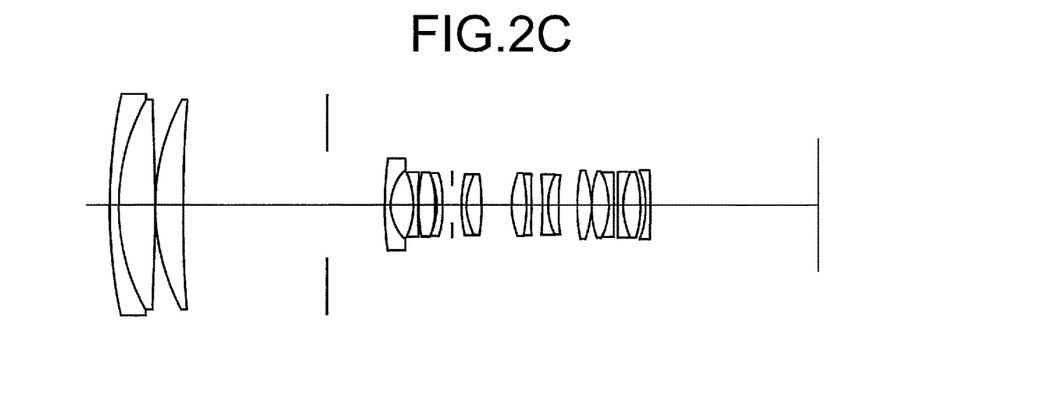

FIGS. 2A, 2B and 2C are sectional views of an optical system according to the Second Example of the present application, in a wide angle end state W, in an intermediate focal length state M and in a telephoto end state T, respectively.

The optical system according to the Second Example of the present application, is composed of a first lens group G1 disposed at a most object side and having positive refractive power, a second lens group G2 disposed at an image side of the first lens group G1 and having negative refractive power, a third lens group G3 disposed at an image side of the second lens group G2 and having positive refractive power, a fourth lens group G4 disposed at an image side of the third lens group G3 and having negative refractive power and a fifth lens group G5 disposed at an image side of the fourth lens group G4 and having positive refractive power. An aperture stop S is disposed at an object side of the third lens group G3.

A stop member ST is disposed between the first lens group G1 and the second lens group G2.

The first lens group G1 is composed of, in order from the object side, a cemented lens constructed by a negative meniscus lens L11 having a convex surface facing the object side cemented with a double convex positive lens L12, and a positive meniscus lens L13 having a convex surface facing the object side.

The second lens group G2 is composed of, in order from the object side, a negative meniscus lens L21 having a convex surface facing the object side, a double concave negative lens L22, a double convex positive lens L23, and a negative meniscus lens L24 having a concave surface facing the object side. The negative meniscus lens L24 is a glass mold type aspherical lens whose object side lens surface is aspherically shaped.

The third lens group G3 is composed of, in order from the object side, a cemented lens constructed by a negative meniscus lens L31 having a convex surface facing the object side cemented with a double convex positive lens L32.

The fourth lens group G4 is composed of, in order from the object, a cemented lens constructed by a double convex positive lens L41 cemented with a double concave negative lens L42, and a cemented lens constructed by a double concave negative lens L43 cemented with a positive meniscus lens L44 having a convex surface facing the object side. The double concave negative lens L42 is a glass mold type aspherical lens whose object side surface is aspherically shaped.

The fifth lens group G5 is composed of, in order from the object side, a double convex positive lens L51, a cemented lens constructed by a double convex positive lens L52 cemented with a negative meniscus lens L53 having a concave surface facing the object side, a cemented lens constructed by a negative meniscus lens L54 having a convex surface facing the object side cemented with a double convex positive lens L55, and a negative meniscus lens L56 having a convex surface facing the object side. The negative meniscus lens L56 is a glass mold type aspherical lens whose image side lens surface is aspherically shaped, and light rays exited from the negative meniscus lens L56 form an image on an imaging plane I.

By the above described configuration, in the variable magnification optical system according to the present Second Example, upon zooming from the wide angle end state W to the telephoto end state T, with respect to the imaging plane I, the first lens group G1 is moved toward the object side monotonously, the second lens group G2 is moved toward the object side from the wide angle end state W to the intermediate focal length state M and toward the image side from the intermediate focal length state M to the telephoto end state T, the third lens group G3 is moved toward the object side monotonously, the aperture stop S, the fourth lens group G4 and the fifth lens group G5 are moved toward the object side from the wide angle end state W to the intermediate focal length state M and toward the image side from the intermediate focal length state M to the telephoto end state T, such that a distance between the first lens group G1 and the second lens group G2 is increased, a distance between the second lens group G2 and the third lens group G3 is decreased, a distance between the third lens group G3 and the fourth lens group G4 is increased, a distance between the fourth lens group G4 and the fifth lens group G5 is decreased, a distance between the aperture stop S and the third lens group G3 is decreased, and the aperture stop S and the fourth lens group G4 are moved in a body.

With respect to the stop member ST, upon zooming from the wide angle end state W to the telephoto end state T, a distance between the first lens group G1 and the stop member ST is increased, and a distance between the stop member ST and the second lens group G2 is increased.

Incidentally, in the present Second Example a low pass filter, a glass for covering a sensor and the like which are not illustrated may be disposed between the negative meniscus lens L56 and the image plane I.

Table 2 below shows various values of the variable magnification optical system according to the present Second Example.

TABLE 2

Second Example

[Surface Data]

| Surface number | r | d | nd | vd |
|---|---|---|---|---|
| OP | ∞ | | | |
| 1 | 104.5118 | 1.6000 | 2.003300 | 28.27 |
| 2 | 39.3751 | 7.4000 | 1.497820 | 82.57 |
| 3 | −463.5701 | 0.1000 | | |
| 4 | 40.3116 | 5.4000 | 1.834810 | 42.73 |
| 5 | 241.9089 | variable | | |

TABLE 2-continued

Second Example

| *6 | 79.9711 | 1.0000 | 1.851350 | 40.10 |
|---|---|---|---|---|
| 7 | 8.1252 | 4.8500 | | |
| 8 | −14.2116 | 1.0000 | 1.883000 | 40.66 |
| 9 | 124.9279 | 0.1000 | | |
| 10 | 30.8124 | 3.3500 | 1.808090 | 22.74 |
| 11 | −15.1873 | 0.3000 | | |
| 12 | −13.2222 | 1.0000 | 1.883000 | 40.66 |
| 13 | −23.0302 | variable | | |
| 14 (STOP) | ∞ | variable | | |
| 15 | 26.1923 | 1.0000 | 1.954000 | 33.46 |
| 16 | 12.2483 | 2.8500 | 1.719990 | 50.27 |
| 17 | −43.5073 | variable | | |
| 18 | 14.5527 | 2.8500 | 1.497820 | 82.57 |
| 19 | −40.3302 | 1.0000 | 1.950000 | 29.37 |
| 20 | 173.4596 | 2.1500 | | |
| *21 | −105.0156 | 1.0000 | 1.806100 | 40.71 |
| 22 | 10.9037 | 2.2000 | 1.808090 | 22.74 |
| 23 | 28.6084 | variable | | |
| 24 | 30.6882 | 2.8500 | 1.579570 | 53.74 |
| 25 | −18.3905 | 0.1000 | | |
| 26 | 18.8919 | 3.6000 | 1.518230 | 58.82 |
| 27 | −13.1344 | 1.0000 | 2.000690 | 25.46 |
| 28 | −2198.5412 | 0.7500 | | |
| 29 | 412.2295 | 1.0000 | 1.954000 | 33.46 |
| 30 | 12.8823 | 3.5000 | 1.755200 | 27.57 |
| 31 | −23.7185 | 1.1500 | | |
| 32 | −16.1296 | 1.0000 | 1.806100 | 40.71 |
| *33 | −97.3104 | BF | | |
| Image plane | ∞ | | | |

[Aspherical Surface Data]

Surface number: 6

| κ | −8.7294 |
|---|---|
| A4 | 4.64796E−05 |
| A6 | −4.09659E−07 |
| A8 | 2.44519E−09 |
| A10 | −9.90503E−12 |

Surface number: 21

| κ | −1.5760 |
|---|---|
| A4 | 1.72590E−05 |
| A6 | 9.45415E−08 |
| A8 | −1.00397E−09 |
| A10 | 0.00000E+00 |

Surface number: 33

| κ | −19.8082 |
|---|---|
| A4 | −1.67719E−05 |
| A6 | −2.11776E−07 |
| A8 | −4.15932E−10 |
| A10 | −1.15008E−11 |

[Various Data]

| Variable magnification ratio | 9.42 | |
|---|---|---|
| | W | T |
| f | 10.30 ~ | 97.00 |
| FNO | 4.09 ~ | 5.81 |
| ω | 40.21 ~ | 4.76° |
| Y | 8.19 ~ | 8.19 |

| | W | M | T |
|---|---|---|---|
| f | 10.30000 | 50.00013 | 97.00039 |
| ω | 40.21337 | 9.15519 | 4.75685 |
| FNO | 4.09 | 5.78 | 5.81 |
| φ | 7.68 | 8.50 | 9.20 |
| TL | 100.29944 | 130.25093 | 139.59967 |
| d5 | 2.10000 | 28.50000 | 39.66696 |
| d13 | 17.38897 | 3.31447 | 2.00000 |
| d14 | 4.87082 | 3.98262 | 1.60000 |
| d17 | 2.59389 | 3.48209 | 5.86471 |
| d23 | 5.29632 | 3.42829 | 3.30000 |
| BF | 13.94944 | 33.44346 | 33.06800 |

TABLE 2-continued

Second Example

[Lens Group Data]

| Group | Starting surface | f |
|---|---|---|
| 1(f1) | 1 | 64.387056 |
| 2 | 6 | −9.57903 |
| 3 | 15 | 29.91408 |
| 4 | 18 | −81.48313 |
| 5 | 24 | 28.77173 |

[Stop Member Disposition]

|  | W | M | T |
|---|---|---|---|
| f | 10.30000 | 50.00013 | 97.00039 |
| d5 | 2.10000 | 28.50000 | 39.66696 |
| ds | 2.40000 | 20.40000 | 28.60000 |
| ds2 | −0.30000 | 8.10000 | 11.06696 |
| φe | 17.2 | 16.6 | 14.5 |
| φs = 22.5 | | | |
| φ1 = 40.0 | | | |
| φ2 = 17.5 | | | |

[Values for Conditional Expressions]

(1) ds/f1 = 0.44 (in the telephoto end state)
(2) φs = 22.5 (unit: mm)
1.00 × φ2 = 17.5
0.80 × φ1 = 32.0

In the optical system according to the Second Example of the present application, the aperture diameter φs of the stop member ST is larger than the effective diameter φe of the light rays at the position of the stop member ST. A light reduction ratio by the stop member ST in the telephoto end state T is about 55% in the imaging point position of the first lens group G1 at the height 22 mm from the optical axis, thus attaining sufficient light reduction effect.

THIRD EXAMPLE

Figure 3A:
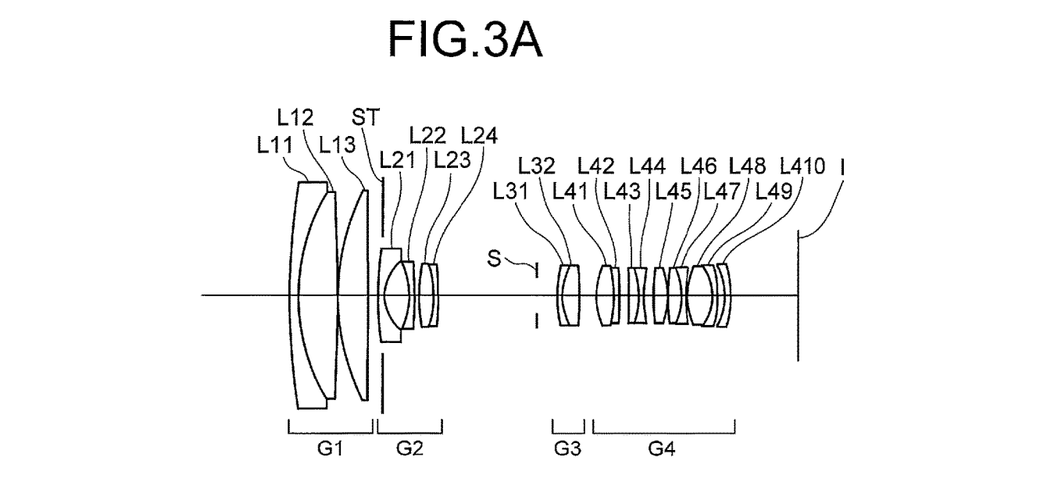
FIGS. 3A, 3B and 3C are sectional views showing an optical system according to a Third Example of the present application, in a wide angle end state, in an intermediate focal length state and in a telephoto end state, respectively.
Figure 3B:
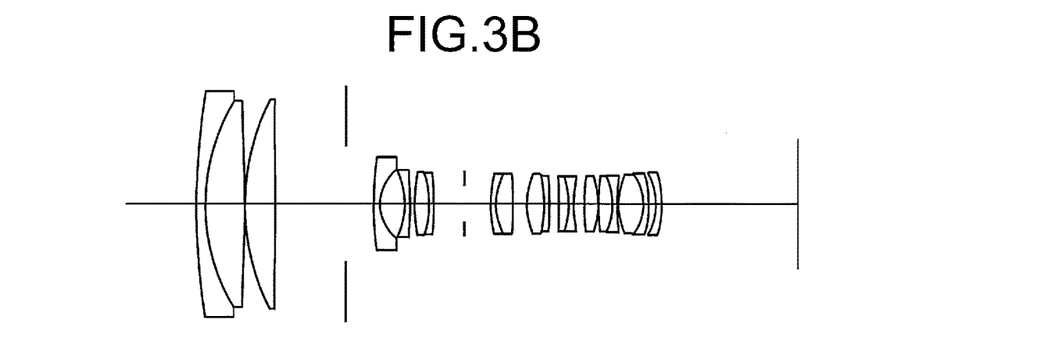
Figure 3C:
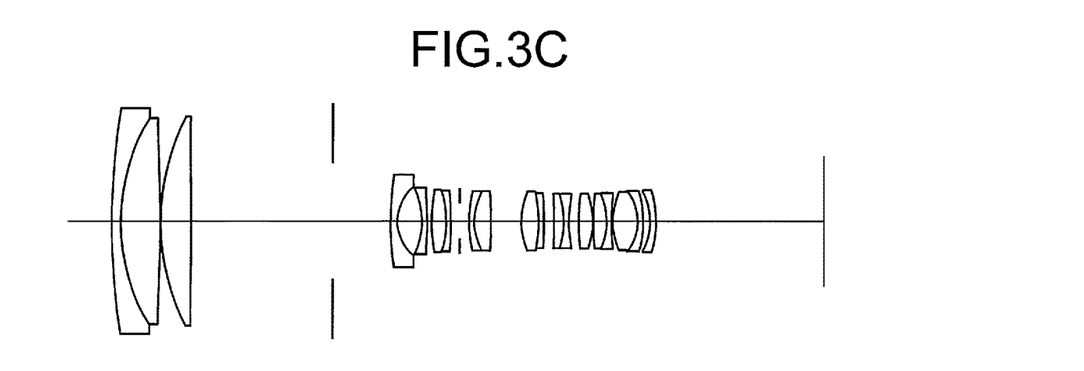

FIGS. 3A, 3B and 3C are sectional views showing an optical system according to a Third Example of the present application, in a wide angle end state W, in an intermediate focal length state M and in a telephoto end state T, respectively.

The optical system according to the third Example of the present application, is composed of a first lens group G1 disposed at the most object side and having positive refractive power, a second lens group G2 disposed at an image side of the first lens group G1 and having negative refractive power, a third lens group G3 disposed at an image side of the second lens group G2 and having positive refractive power, a fourth lens group G4 disposed at an image side of the third lens group G3 and having positive refractive power. An aperture stop S is disposed at an object side of the third lens group G3.

The first lens group G1 is composed of, in order from the object side, a cemented lens constructed by a negative meniscus lens L11 having a convex surface facing the object side cemented with a double convex positive lens L12, and a plano-convex positive lens L13 having a convex surface facing the object side.

The second lens group G2 is composed of, in order from the object side, a negative meniscus lens L21 having a convex surface facing the object side, a negative meniscus lens L22 having a concave surface facing the object side, and a cemented lens constructed by a double convex positive lens L23 cemented with a negative meniscus lens L24 having a concave surface facing the object side. The negative meniscus lens L21 is a compound-type aspherical lens formed by a resin material and a glass material, whose object side lens surface is aspherically shaped.

A stop member ST is disposed between the first lens group G1 and the second lens group G2.

The third lens group G3 is composed of, in order from the object side, a cemented lens constructed by a negative meniscus lens L31 having a convex surface facing the object side cemented with a double convex positive lens L32.

The fourth lens group G4 is composed of, in order from the object, a cemented lens constructed by a double convex positive lens L41 cemented with a negative meniscus lens L42 having a convex surface facing the image side, a cemented lens constructed by a positive meniscus lens L43 having a concave surface facing the object side cemented with a double concave negative lens L44, a double convex positive lens L45, a cemented lens constructed by a double convex positive lens L46 cemented with a double concave negative lens L47, a cemented lens constructed by a double convex positive lens L48 cemented with a negative meniscus lens L49 having a convex surface facing the image side, and a negative meniscus lens L410 having a concave surface facing the object side. The double concave negative lens L44 is a glass mold type aspherical lens whose image side surface is aspherically shaped, and the negative meniscus lens L410 is a glass mold type aspherical lens whose image side surface is aspherically shaped. Light rays exited from the negative meniscus lens L410 forms an image on an imaging plane I.

By the above described configuration, in the variable magnification optical system according to the present Third Example, upon zooming from the wide angle end state W to the telephoto end state T, with respect to the image plane I, the first lens group G1 is moved toward the object side monotonously, the second lens group G2 is moved toward the object side, the aperture stop S, the third lens group G3 and the fourth lens group G4 are moved toward the object side monotonously, such that a distance between the first lens group G1 and the second lens group G2 is increased, a distance between the second lens group G2 and the third lens group G3 is decreased, a distance between the third lens group G3 and the fourth lens group G4 is decreased from the wide angle end state W to the intermediate focal length state M and is increased from the intermediate focal length state M to the telephoto end state T, and a distance between the aperture stop S and the third lens group G3 is increased from the wide angle end state W to the intermediate focal length state M and is decreased from the intermediate focal length state M to the telephoto end state T. The aperture stop S and the fourth lens group G4 are moved in a body.

With respect to the stop member ST, upon zooming from the wide angle end state W to the telephoto end state T, a distance between the first lens group G1 and the stop member ST is increased, and a distance between the stop member ST and the second lens group G2 is increased, Incidentally, in the present Example a low pass filter, a glass for covering a sensor and the like which are not illustrated may be disposed between the negative meniscus lens L19 and the image plane I.

Table 3 below shows various values of the lens system according to the Third Example.

TABLE 3

Third Example

[Surface Data]

| Surface number | r | d | nd | νd |
|---|---|---|---|---|
| OP | ∞ | | | |
| 1 | 145.1831 | 1.7000 | 2.001000 | 29.14 |
| 2 | 36.6390 | 8.1000 | 1.497820 | 82.57 |
| 3 | −399.3519 | 0.1000 | | |
| 4 | 43.2076 | 6.0000 | 1.883000 | 40.66 |
| 5 | ∞ | variable | | |
| *6 | 436.5967 | 0.1000 | 1.553890 | 38.09 |
| 7 | 87.0031 | 1.1000 | 1.834810 | 42.73 |
| 8 | 8.3001 | 5.3500 | | |
| 9 | −12.6073 | 1.0000 | 1.755000 | 52.34 |
| 10 | −32.7993 | 0.8000 | | |
| 11 | 41.1197 | 2.9500 | 1.808090 | 22.74 |
| 12 | −19.6043 | 0.9000 | 1.883000 | 40.66 |
| 13 | −73.1316 | variable | | |
| 14 (STOP) | ∞ | variable | | |
| 15 | 22.3725 | 0.9000 | 1.902650 | 35.73 |
| 16 | 12.2299 | 3.4500 | 1.670030 | 47.14 |
| 17 | −59.6992 | variable | | |
| 18 | 13.7390 | 3.6000 | 1.497820 | 82.57 |
| 19 | −24.8201 | 0.9000 | 2.000690 | 25.46 |
| 20 | −270.0138 | 2.2000 | | |
| 21 | −117.0547 | 2.0500 | 1.846660 | 23.80 |
| 22 | −15.9850 | 1.0000 | 1.773770 | 47.25 |
| *23 | 24.1750 | 2.0836 | | |
| 24 | 66.3654 | 2.8000 | 1.568830 | 56.00 |
| 25 | −15.4473 | 0.1000 | | |
| 26 | 44.9939 | 2.7500 | 1.517420 | 52.20 |
| 27 | −15.2012 | 0.9000 | 1.903660 | 31.27 |
| 28 | 29.9926 | 0.3000 | | |
| 29 | 14.6093 | 5.0500 | 1.672700 | 32.19 |
| 30 | −9.1997 | 0.9000 | 2.000690 | 25.46 |
| 31 | −24.3892 | 1.4000 | | |
| 32 | −12.8617 | 1.0000 | 1.851350 | 0.10 |
| *33 | −27.4946 | variable | | |
| Image plane | ∞ | | | |

[Aspherical Surface Data]

Surface number: 6

| κ | 20.0000 |
|---|---|
| A4 | 9.17458E−05 |
| A6 | −6.51986E−07 |
| A8 | 2.69890E−09 |
| A10 | −1.23751E−11 |

Surface number: 23

| κ | 0.4823 |
|---|---|
| A4 | −7.24815E−06 |
| A6 | −3.60139E−07 |
| A8 | 4.05630E−09 |
| A10 | 0.00000E+00 |

Surface number: 33

| κ | −20.0000 |
|---|---|
| A4 | −1.22780E−04 |
| A6 | 8.28360E−07 |
| A8 | −6.05245E−09 |
| A10 | −9.88805E−11 |

[Various Data]

| Variable magnification ratio | | 9.42 | |
|---|---|---|---|
| | W | | T |
| f | 10.30 | ~ | 96.99 |
| FNO | 4.12 | ~ | 5.81 |
| ω | 40.44 | ~ | 4.73° |
| Y | 8.19 | ~ | 8.19 |

| | W | M | T |
|---|---|---|---|
| f | 10.30260 | 30.00000 | 96.99284 |
| ω | 40.44283 | 14.85841 | 4.72723 |
| FNO | 4.12 | 5.48 | 5.81 |
| φ | 8.12 | 8.12 | 9.70 |
| TL | 103.02710 | 121.37977 | 143.32397 |
| d5 | 2.10606 | 20.13084 | 40.20889 |
| d13 | 19.66416 | 6.24359 | 1.80000 |
| d14 | 4.27874 | 4.97381 | 1.80000 |
| d17 | 3.43763 | 2.74256 | 5.91637 |
| BF | 14.05688 | 27.80535 | 34.11509 |

[Lens Group Data]

| Group | Starting surface | f |
|---|---|---|
| 1 (f1) | 1 | 64.09778 |
| 2 | 6 | −10.16794 |
| 3 | 15 | 31.06055 |
| 4 | 18 | 67.05869 |

[Stop Member Disposition]

| | W | M | T |
|---|---|---|---|
| f | 10.30260 | 30.00000 | 96.99284 |
| d5 | 2.10606 | 20.13084 | 40.20889 |
| ds | 3.20000 | 13.60000 | 25.00000 |
| ds2 | −1.09394 | 6.53084 | 15.20889 |
| φe | 14.6 | 18.3 | 18.0 |

φs = 27.2
φ1 = 39.5
φ2 = 21.5

[Values for Conditional Expressions]

(1) ds/f1 = 0.39 (in the wide angle end state)
(2) φs = 27.2 (unit: mm)
1.00 × φ2 = 21.5
0.80 × φ1 = 31.6

In the optical system according to the present Third Example, the aperture diameter φs of the stop member ST is larger than the effective diameter φe of the light rays at the position of the stop member ST. A light reduction ratio by the stop member ST in the telephoto end state T is about 33% in the imaging point position of the first lens group G1 at the height 22 mm from the optical axis, thus attaining sufficient light reduction effect.

FOURTH EXAMPLE

Figure 4A:
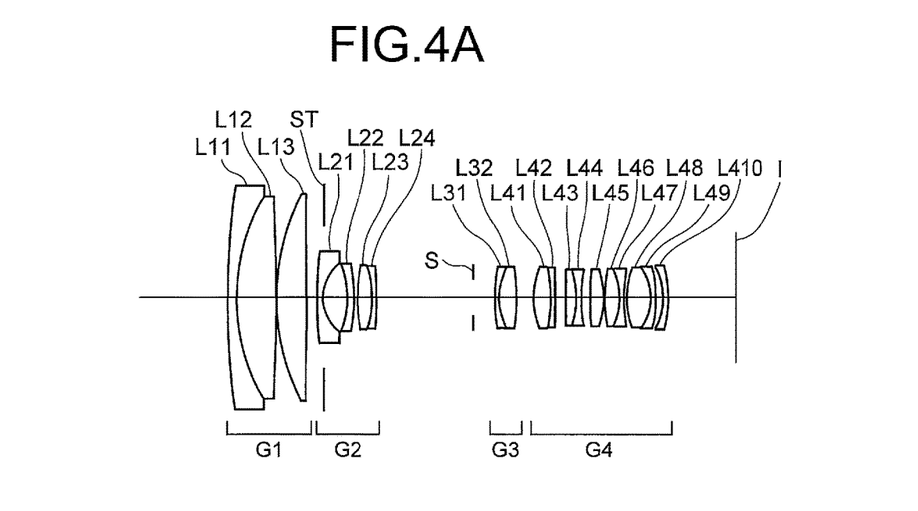
FIGS. 4A, 4B and 4C a are sectional views showing an optical system according to a Fourth Example of the present application, in a wide angle end state, in an intermediate focal length state and in a telephoto end state, respectively.
Figure 4B:
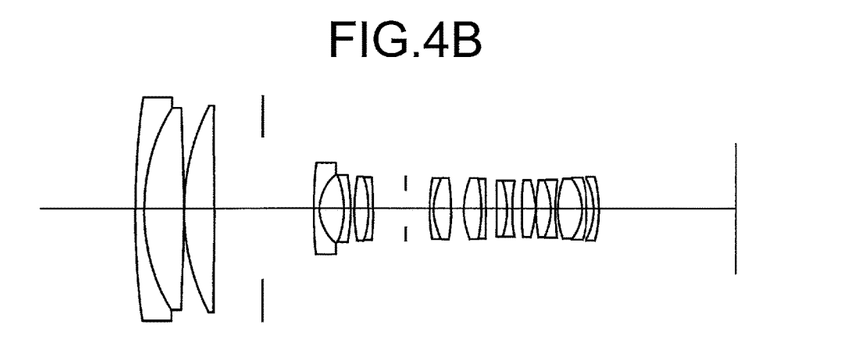
Figure 4C:
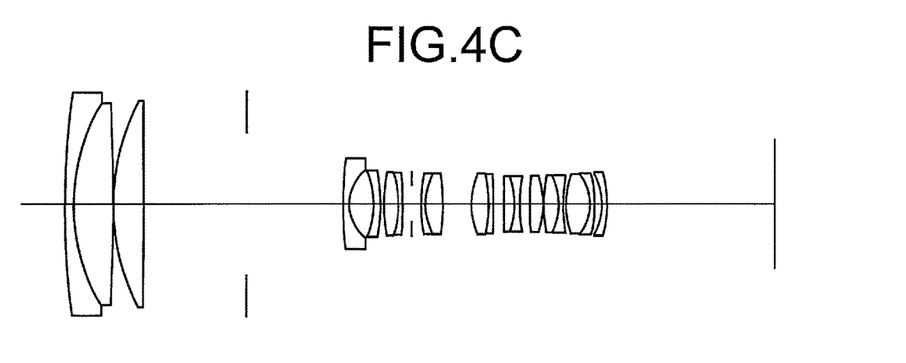

FIGS. 4A, 4B and 4C are sectional views showing an optical system according to the Fourth Example of the present application, in a wide angle end state W, in an intermediate focal length state M and in a telephoto end state T, respectively.

The optical system according to the Fourth Example of the present application, is composed of a first lens group G1 disposed at a most object side and having positive refractive power, a second lens group G2 disposed at an image side of the first lens group G1 and having negative refractive power, a third lens group G3 disposed at an image side of the second lens group G2 and having positive refractive power, a fourth lens group G4 disposed at an image side of the third lens group G3 and having positive refractive power. An aperture stop S is disposed at an object side of the third lens group G3.

The first lens group G1 is composed of, in order from the object side, a cemented lens constructed by a negative meniscus lens L11 having a convex surface facing the object side cemented with a double convex positive lens L12, and a plano-convex positive lens L13 having a convex surface facing the object side.

The second lens group G2 is composed of, in order from the object side, a negative meniscus lens L21 having a convex surface facing the object side, a negative meniscus lens L22 having a concave surface facing the object side, and a cemented lens constructed by a double convex positive lens L23 cemented with a negative meniscus lens L24 having a concave surface facing the object side, and a negative meniscus lens L24 having a concave surface facing the object side. The negative meniscus lens L21 is a compound-type aspherical lens formed by a resin material and a glass material, whose object side lens surface is aspherically shaped.

The stop member ST is disposed between the first lens group G1 and the second lens group G2.

The third lens group G3 is composed of, in order from the object side, a cemented lens constructed by a negative meniscus lens L31 having a convex surface facing the object side cemented with a double convex positive lens L32.

The fourth lens group G4 is composed of, in order from the object side, a cemented lens constructed by a double convex positive lens L41 cemented with a negative meniscus lens L42 having a convex surface facing the image side, a cemented lens constructed by a positive meniscus lens L43 having a concave surface facing the object side cemented with a double concave negative lens L44, a double convex positive lens L45, a cemented lens constructed by a double convex positive lens L46 cemented with a double concave negative lens L47, a cemented lens constructed by a double convex positive lens L48 cemented with a negative meniscus lens L49 having a convex surface facing the image side, and a negative meniscus lens L410 having a concave surface facing the object side. The double concave negative lens L44 is a glass mold type aspherical lens whose image side surface is aspherically shaped, and the negative meniscus lens L410 is a glass mold type aspherical lens whose image side surface is aspherically shaped. Light rays exited from the negative meniscus lens L410 forms an image on the image plane I.

By the above described configuration, in the variable magnification optical system according to the present Fourth Example, upon zooming from the wide angle end state W to the telephoto end state T, with respect to the image plane I, the first lens group G1 is moved toward the object side monotonously, the second lens group G2 is moved toward the object side, and the aperture stop S, the third lens group G3 and the fourth lens group G4 are moved monotonously toward the object side, such that a distance between the first lens group G1 and the second lens group G2 is increased, a distance between the second lens group G2 and the third lens group G3 is decreased, a distance between the third lens group G3 and the fourth lens group G4 is decreased from the wide angle end state W to the intermediate focal length state M and increased from the intermediate focal length state M to the telephoto end state T, and a distance between the aperture stop S and the third lens group G3 is increased from the wide angle end state W to the intermediate focal length state M and decreased from the intermediate focal length state M to the telephoto end state T. The aperture stop S and the fourth lens group G4 are moved in a body.

With respect to the stop member ST, upon zooming from the wide angle end state W to the telephoto end state T, a distance between the first lens group G1 and the stop member ST is increased, and a distance between the stop member ST and the second lens group G2 is increased.

Incidentally, in the present Fourth Example a low pass filter, a glass for covering a sensor and the like which are not illustrated, may be disposed between the negative meniscus lens L19 and the image plane I.

Table 4 below shows various values of the variable magnification optical system according to the present Fourth Example.

TABLE 4

Fourth Example

[Surface Data]

| Surface number | r | d | nd | νd |
|---|---|---|---|---|
| OP | ∞ | | | |
| 1 | 145.1831 | 1.7000 | 2.001000 | 29.14 |
| 2 | 36.6390 | 8.1000 | 1.497820 | 82.57 |
| 3 | −399.3519 | 0.1000 | | |
| 4 | 43.2076 | 6.0000 | 1.883000 | 40.66 |
| 5 | ∞ | variable | | |
| *6 | 436.5967 | 0.1000 | 1.553890 | 38.09 |
| 7 | 87.0031 | 1.1000 | 1.834810 | 42.73 |
| 8 | 8.3001 | 5.3500 | | |
| 9 | −12.6073 | 1.0000 | 1.755000 | 52.34 |
| 10 | −32.7993 | 0.8000 | | |
| 11 | 41.1197 | 2.9500 | 1.808090 | 22.74 |
| 12 | −19.6043 | 0.9000 | 1.883000 | 40.66 |
| 13 | −73.1316 | variable | | |
| 14 (STOP) | ∞ | variable | | |
| 15 | 22.3725 | 0.9000 | 1.902650 | 35.73 |
| 16 | 12.2299 | 3.4500 | 1.670030 | 47.14 |
| 17 | −59.6992 | variable | | |
| 18 | 13.7390 | 3.6000 | 1.497820 | 82.57 |
| 19 | −24.8201 | 0.9000 | 2.000690 | 25.46 |
| 20 | −270.0138 | 2.2000 | | |
| 21 | −117.0547 | 2.0500 | 1.846660 | 23.80 |
| 22 | −15.9850 | 1.0000 | 1.773770 | 47.25 |
| *23 | 24.1750 | 2.0836 | | |
| 24 | 66.3654 | 2.8000 | 1.568830 | 56.00 |
| 25 | −15.4473 | 0.1000 | | |
| 26 | 44.9939 | 2.7500 | 1.517420 | 52.20 |
| 27 | −15.2012 | 0.9000 | 1.903660 | 31.27 |
| 28 | 29.9926 | 0.3000 | | |
| 29 | 14.6093 | 5.0500 | 1.672700 | 32.19 |
| 30 | −9.1997 | 0.9000 | 2.000690 | 25.46 |
| 31 | −24.3892 | 1.4000 | | |
| 32 | −12.8617 | 1.0000 | 1.851350 | 40.10 |
| *33 | −27.4946 | variable | | |
| Image plane | ∞ | | | |

[Aspherical Surface Data]

Surface number: 6

| κ | 20.0000 |
|---|---|
| A4 | 9.17458E−05 |
| A6 | −6.51986E−07 |
| A8 | 2.69890E−09 |
| A10 | −1.23751E−11 |

Surface number: 23

| κ | 0.4823 |
|---|---|
| A4 | −7.24815E−06 |
| A6 | −3.60139E−07 |
| A8 | 4.05630E−09 |
| A10 | 0.00000E+00 |

Surface number: 33

| κ | −20.0000 |
|---|---|
| A4 | −1.22780E−04 |
| A6 | 8.28360E−07 |
| A8 | −6.05245E−09 |
| A10 | −9.88805E−11 |

[Various Data]

| Variable magnification ratio | | 9.42 | |
|---|---|---|---|
| | | W | T |
| f | | 10.30 ~ | 96.99 |
| FNO | | 4.12 ~ | 5.81 |

TABLE 4-continued

Fourth Example

| ω | 40.44 ~ 4.73° |
| Y | 8.19 ~ 8.19 |

| | W | M | T |
| --- | --- | --- | --- |
| f | 10.30260 | 30.00000 | 96.99284 |
| ω | 40.44283 | 14.85841 | 4.72723 |
| FNO | 4.12 | 5.48 | 5.81 |
| φ | 8.12 | 8.12 | 9.70 |
| TL | 103.02710 | 121.37977 | 143.32397 |
| d5 | 2.10606 | 20.13084 | 40.20889 |
| d13 | 19.66416 | 6.24359 | 1.80000 |
| d14 | 4.27874 | 4.97381 | 1.80000 |
| d17 | 3.43763 | 2.74256 | 5.91637 |
| BF | 14.05688 | 27.80535 | 34.11509 |

[Lens Group Data]

| Group | Starting surface | f |
| --- | --- | --- |
| 1(f1) | 1 | 64.09778 |
| 2 | 6 | −10.16794 |
| 3 | 15 | 31.06055 |
| 4 | 18 | 67.05869 |

[Stop Member Disposition]

| | W | M | T |
| --- | --- | --- | --- |
| f | 10.30260 | 30.00000 | 96.99284 |
| d5 | 2.10606 | 20.13084 | 40.20889 |
| ds | 4.20000 | 10.10000 | 21.40000 |
| ds2 | −2.09394 | 10.03084 | 18.80889 |
| φe | 10.7 | 22.4 | 20.8 |
| φs = 25.0 | | | |
| φ1 = 39.5 | | | |
| φ2 = 21.5 | | | |

[Values for Conditional Expressions]

(1) ds/f1 = 0.33 (in the telephoto end state)
(2) φs = 25.0 (unit: mm)
1.00 × φ2 = 21.5
0.80 × φ1 = 31.6

In the optical system according to the present Fourth Example, the aperture diameter φs of the stop member ST is larger than the effective diameter φe of the light rays at the position of the stop member ST. A light reduction ratio by the stop member ST in the telephoto end state T is about 43% in the imaging point position of the first lens group G1 at the height 22 mm from the optical axis, thus attaining sufficient light reduction effect.

According to each example as described above, it is possible to realize a variable magnification optical system which can reduce light rays outside of an effective light flux (a largest angle of view) collected on a focal point position of a lens group having positive refractive power with no influence on the effective light flux, thereby heat generation by any member in the vicinity of the focal point position, being reduced and deformation or deterioration of the member being reduced, so that deterioration of imaging performance is prevented.

Incidentally, each of the Examples as described above demonstrates one specific example, however, the present application is not limited to these Examples. Contents of the following description can be properly adopted within a range that does not deteriorate the optical performance of the variable magnification optical system of the present application.

With respect to each of the above Examples, Numerical Example of the variable magnification optical system according to the present application has been described as an optical system, however, the present application is not limited to such configurations but the optical system may be a single focal length lens.

The 4-lens-group optical system or the 5-lens-group optical system has been demonstrated by way of the Numerical Examples of the variable magnification optical system according to the present application, however, the present application is not limited to these lens group configurations but can take other lens group configurations, in which, for instance, a 3-lens-group optical system, a 6-lens-group optical system or the like, can be configured as the variable magnification optical system. To be specific, any inconvenience may not be caused by taking a configuration of adding or removing a lens or a lens group on the side closest to the object or on the side closest to the image. Note that the lens group represents a unit including at least one lens element separated by an air gap that varies upon zooming.

In the variable magnification optical system according to the present application, a part of a lens group, one whole lens group, or a plurality of lens groups may be configured to be moved in the direction of the optical axis as a focusing lens group. In particular, it is preferable that at least a part of the third lens group or at least a part of the fourth lens group is made to be a focusing lens group. It is also possible that such focusing lens group is applied to auto focusing, and is suitably driven by a motor, such as an ultrasonic motor etc.

Moreover, the variable magnification optical system according to the present application can be also configured so that the whole or a part of any one of the lens groups is moved as an anti-vibration lens group so as to have a component in the direction perpendicular to the optical axis, or is rotationally moved, i.e., swayed in an intra-plane direction containing the optical axis, thereby correcting the image blur caused by the camera shake etc. Particularly, it is preferable that at least a part of the fourth lens group is formed as the anti-vibration lens group.

Further, a lens surface of each of the lenses configuring the variable magnification optical system according to the present application may be formed as a spherical surface or a flat surface or an aspherical surface. A case that the lens surface is the spherical surface or the flat surface facilitates lens machining and an assembly adjustment and is preferable because of being capable of preventing the optical performance from being deteriorated due to errors of the lens machining and the assembly adjustment. Furthermore, the case is preferable if the image plane deviates, since there is a small amount of deterioration of image rendering performance. If the lens surface is the aspherical surface, it may be sufficient that the lens surface is formed as any one of an aspherical surface based on the cutting work, a glass mold aspherical surface formed by molding a glass in an aspherical shape and a composite aspherical surface formed by coating a resin over the surface of the glass in the aspherical shape. Further, the lens surface may be formed as a diffraction surface, and the lens may be formed as a refractive index distribution type lens (GRIN lens) or a plastic lens.

It is preferable that in the variable magnification optical system according to the present application the aperture stop is disposed in the vicinity of the third lens group or the fourth lens group, however, a lens frame may also substitute for a role of the aperture stop without providing a member as the aperture stop.

Furthermore, the lens surface of each of the lenses configuring the variable magnification optical system according to the present application may be coated with an antireflection film having a high transmittance in a broad wavelength range. With this configuration, it is feasible to reduce a flare and ghost and to attain the high optical performance with the high contrast.

Figure 5:
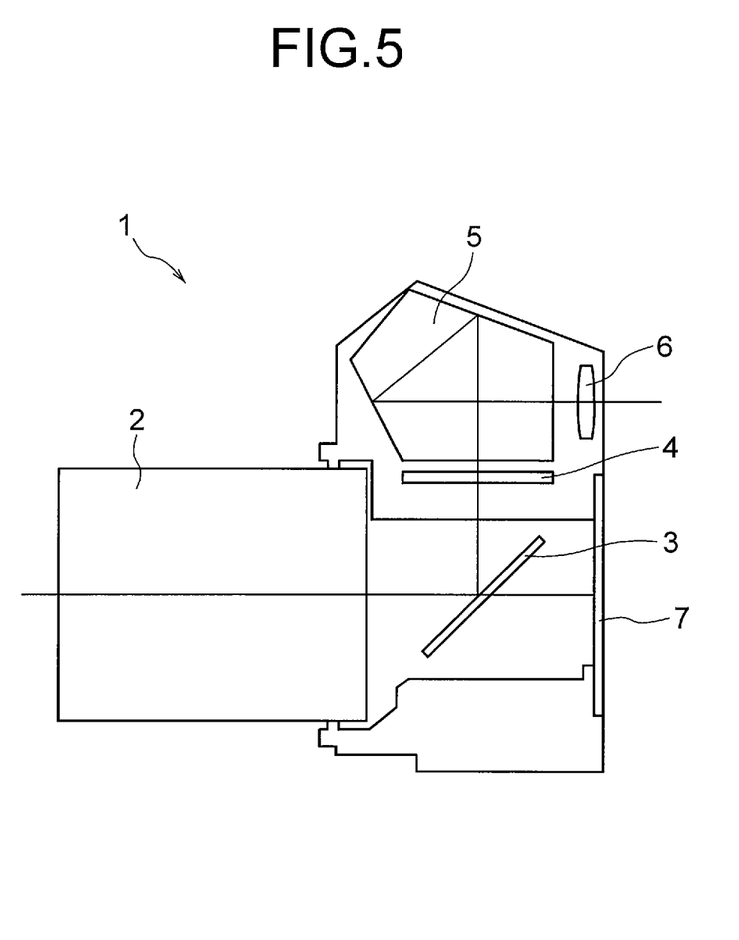
FIG. 5 is a view showing a configuration of an optical apparatus mounted thereon with an optical system according to each Example of the present application.

Next, a camera equipped with the optical system according to the present application will be described with referring to FIG. 5. FIG. 5 is a view showing a configuration of a camera equipped with the optical system according to the present application.

As shown in FIG. 5, the camera is a single lens reflex camera equipped with the variable magnification optical system according to the First Example as the optical system 2.

In the camera 1 according to the embodiment shown in FIG. 5, light rays from an unillustrated object (an object to be imaged) are collected by the optical system 2 according to the First Example, and an image of the collected light is formed on the image plane I of the optical system 2 via a quick return mirror 3, and a real image is formed on a focusing screen 3 that is disposed in the vicinity of the image plane I. The light from the focusing screen 3 is reflected a plural number of times within a pentaprism 4 and guided to an eyepiece optical system 6. The light converted to an erected image through the pentaprism 5 is enlarged through the eyepiece optical system 6 and is guided to an eye point EP. The operation being thus performed, a photographer can observe the image of the object as an erect image via the eyepiece optical system 6.

When the photographer presses an unillustrated release button, the quick return mirror 3 is retracted out of the optical path, the light from the unillustrated object reaches an imaging device 7. Accordingly, the light emitted from the object is captured by the imaging device 7, and stored in an unillustrated memory as a photographed image of the object. In this manner, the photographer can take a picture of the object by the camera 1.

It is noted here that the variable magnification optical system according to the above described First Example installed in the present camera 1 as the optical system 2 is a variable magnification optical system in which light outside of effective light flux (beyond the largest angle of view) collected on the focal point position of a lens group having positive refractive power is reduced, thereby heat generation by a member in the vicinity of the focal point position being reduced, so that deformation or deterioration of the member is prevented and high optical performance is realized with reducing the influence on the imaging performance. Thus, the camera 1 can reduce light outside of effective light flux (beyond the largest angle of view) collected on the focal point position of a lens group having positive refractive power, thereby heat generation by a member in the vicinity of the focal point position being reduced, so that deformation or deterioration of the member is prevented and high optical performance is realized with reducing the influence on the imaging performance. Incidentally, even if a camera is so configured to be equipped with the variable magnification optical system according to each of the above described Second to Fourth Examples as the optical system 2, a similar effect to the camera 1 can be attained. Further, even if the variable magnification optical system according to each of the above described Examples is mounted on a mirror-less camera having no quick return mirror, a similar effect to the camera 1 can be attained.

Next, a lens barrel provided with the optical system according to the present application is explained.

Figure 6:
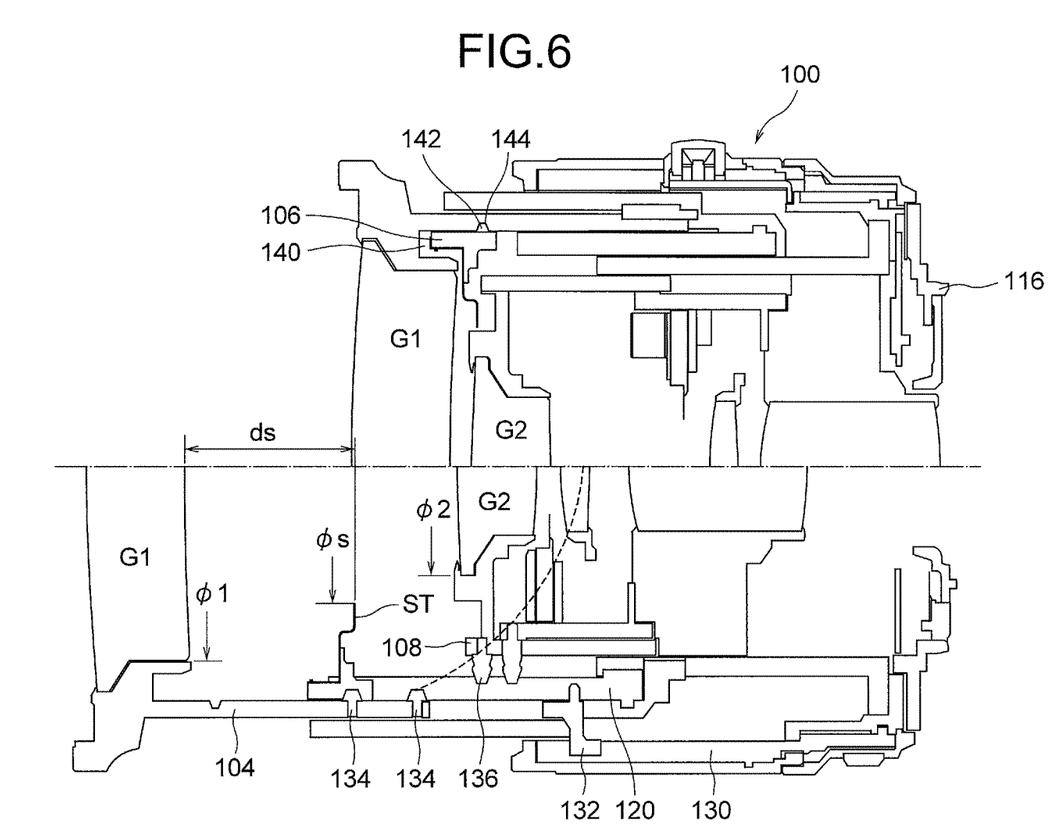
FIG. 6 is a cross sectional view showing an example of a lens barrel of the optical system according to each Example of the present application.

FIG. 6 is a sectional view showing an example of a lens barrel of the optical system according to the present application. In FIG. 6, a sectional view above the optical axis shows a wide angle end state and a sectional view below the optical axis shows a telephoto end state.

In a lens barrel 100 shown in FIG. 6, in order from the object side, a first lens group G1, a stop member ST, a second lens group G2, other members, lens groups and the like are disposed. The first lens group G1, the stop member ST and the second lens group G2 are respectively fixed to a first lens group frame 104, a stop member frame 106 and a second lens group frame 108. On a most image side, a mount portion 116 to be detachably attached to the camera 1 described above is disposed. Upon zooming from the wide angle end state W to the telephoto end state T, the first lens group G1, the second lens group G2, other lens groups and the like are moved along the optical axis by a known mechanism.

A cam cylinder 120 is disposed between the first lens group frame 104 and the second lens group frame 108, and on an outer most periphery of the cam cylinder 120 a zoom ring 130 is disposed. A connecting member 132 is disposed between the cam cylinder 120 and the zoom ring 130.

The cam cylinder 120 is formed with unillustrated cam grooves for moving along the optical axis the first lens group frame 104, the second lens group frame 108 and others.

An elongated guide hole 140 for moving the stop member frame 106 along the optical axis is formed in the vicinity of the most object side end of the cam cylinder 120. The stop member frame 106 is slidably engaged with the elongated guide groove 140, and the stop member frame 106 is provided with a trapezoidal pin 142.

An end of the trapezoidal pin 142 is in engagement with a cam groove 144 which is formed on the first lens group frame 104 to move the stop member.

If the photographer rotates the zoom ring 130 about the optical axis in clockwise or counter clockwise direction, the rotation is transmitted through the connecting pin 132 to the cam cylinder 120, and the first lens group frame 104, the second lens frame 108 and the like are moved back or forth along the optical axis through cam pins 134 and 136 engaged with unillustrated cam grooves formed on the cam cylinder 120 corresponding to the respective moving members. At this time, the stop member ST is moved along the optical axis in association with the movement of the first lens group frame 104 through the trapezoidal pin 142 engaged with the cam groove 144 formed on the first lens group frame 104 for moving the stop member. The cam groove 144 for moving the stop member, is so configured to move the stop member ST toward the object side, upon varying magnification from the wide angle end state to the telephoto end state, and in the vicinity of the telephoto end once from the object side toward the image side and then toward object side. The stop member ST is formed on the surface with an antireflection member.

Since the lens barrel 100 is configured as described above, light outside of the effective light flux (largest angle of view) that is collected on the focal point position (shown in broken line in the drawing) of a lens group (the first lens group) having positive refractive power is reduced and thereby heat generation by a member in the vicinity of the focal point position is reduced, thereby deformation as well as deterioration of the member being prevented, so that the influence on the imaging performance is reduced.

What is claimed is:

1. An optical system comprising:
   a first lens group disposed most toward an object side in the optical system and having positive refractive power, a second lens group disposed at an image side of the first lens group, an aperture stop, a stop member provided in addition to the aperture stop and disposed next to the first lens group between the first lens group and the second lens group, and one or more lens groups disposed on the image side of the second lens group, wherein the optical system is adapted to vary magnification, upon varying magnification from a wide angle end state to a telephoto end state, a distance between the second lens group and the stop member varies, and the following conditional expressions are satisfied:

$$0.20 < ds/f1 < 0.60$$

$$1.00 \times \varphi 2 < \varphi s < 0.8 \times \varphi 1 \quad \text{(unit: mm)}$$

where ds denotes a distance in a telephoto end state along an optical axis between a lens surface of a most image side lens in the first lens group and the stop member, f1 denotes a focal length of the first lens group, φ1 denotes an outer diameter of a most image side lens in the first lens group, φ2 denotes an outer diameter of a most object side lens in the second lens group, and φs denotes a diameter of an aperture of the stop member.

2. The optical system according to claim 1, wherein an aperture diameter of the stop member is larger than an effective diameter of the optical system in a position of the stop member along an optical axis.

3. The optical system according to claim 1, wherein upon varying magnification from a wide angle end state to a telephoto end state, a distance between the first lens group and the second lens group varies.

4. The optical system according to claim 1, wherein upon varying magnification from a wide angle end state to a telephoto end state, a distance between the first lens group and the stop member varies.

5. The optical system according to claim 1, wherein the optical system further comprises a moving mechanism for moving the stop member along the optical axis, upon varying magnification from a wide angle end state to a telephoto end state.

6. The optical system according to claim 1, wherein the stop member has an anti-reflection member on a surface.

7. The optical system according to claim 1, wherein a position of an optical axis side end of the stop member in a direction of an optical axis is at a more image side than a position of a barrel side end of the stop member in the direction of the optical axis.

8. An optical apparatus equipped with the optical system according to claim 1.

9. The optical system according to claim 1, wherein an aperture diameter of the stop member is fixed.

10. A method for manufacturing an optical system comprising a first lens group disposed most toward an object side in the optical system and having positive refractive power, a second lens group disposed at an image side of the first lens group, an aperture stop, a stop member provided in addition to the aperture stop and disposed next to the first lens group between the first lens group and the second lens group, and one or more lens groups disposed on the image side of the second lens group, the method comprising:

arranging the lens groups and the stops such that the optical system is adapted to vary magnification, and such that, upon varying magnification from a wide angle end state to a telephoto end state, a distance between the second lens group and the stop member varies, and satisfying the following conditional expressions:

$$0.20 < ds/f1 < 0.60$$

$$1.00 \times \varphi 2 < \varphi s < 0.8 \times \varphi 1 \, \text{(unit: mm)}$$

where ds denotes a distance in a telephoto end state along an optical axis between a lens surface of a most image side lens in the first lens group and the stop member, f1 denotes a focal length of the first lens group, φ1 denotes an outer diameter of a most image side lens in the first lens group, φ2 denotes an outer diameter of a most object side lens in the second lens group, and φs denotes a diameter of an aperture of the stop member.

* * * * *